US011933213B2

(12) United States Patent
Cox et al.

(10) Patent No.: US 11,933,213 B2
(45) Date of Patent: Mar. 19, 2024

(54) SYSTEMS AND METHODS FOR MAINTAINING AFTERTREATMENT CAPABILITY DURING VEHICLE LIFE

(71) Applicant: Ford Global Technologies, LLC, Dearborn, MI (US)

(72) Inventors: David Cox, London (GB); Mario Balenović, Waalre (NL); Christopher Ponter, Havering (GB); Larry Rogosin, Farmington Hills, MI (US); Craig Peacock, Billericay (GB)

(73) Assignee: Ford Global Technologies, LLC, Dearborn, MI (US)

( * ) Notice: Subject to any disclaimer, the term of this patent is extended or adjusted under 35 U.S.C. 154(b) by 112 days.

(21) Appl. No.: 17/552,029

(22) Filed: Dec. 15, 2021

(65) Prior Publication Data
US 2023/0184153 A1  Jun. 15, 2023

(51) Int. Cl.
*F01N 9/00* (2006.01)
*F01N 3/035* (2006.01)
*F01N 3/20* (2006.01)

(52) U.S. Cl.
CPC ............. *F01N 9/002* (2013.01); *F01N 3/035* (2013.01); *F01N 3/2013* (2013.01); *F01N 2240/16* (2013.01); *F01N 2250/02* (2013.01); *F01N 2900/0602* (2013.01)

(58) Field of Classification Search
CPC ........ F01N 9/002; F01N 3/035; F01N 3/2013; F01N 2240/16; F01N 2250/02; F01N 2900/0602
See application file for complete search history.

(56) References Cited

U.S. PATENT DOCUMENTS

| 5,404,720 | A | 4/1995 | Laing |
| 6,871,490 | B2 * | 3/2005 | Liang .................... F02D 41/005 60/287 |
| 7,093,427 | B2 * | 8/2006 | van Nieuwstadt ...... F01N 9/005 60/276 |
| 8,701,394 | B2 | 4/2014 | Sobue |
| 8,826,652 | B2 | 9/2014 | Gonze et al. |
| 8,925,301 | B2 | 1/2015 | Hashimoto |
| 9,212,591 | B2 | 12/2015 | Czimmek et al. |
| 2007/0044456 | A1 * | 3/2007 | Upadhyay ............... F01N 3/208 60/297 |
| 2007/0144152 | A1 * | 6/2007 | Lueders .................. F01N 3/035 60/297 |

(Continued)

*Primary Examiner* — Matthew T Largi

(74) *Attorney, Agent, or Firm* — Haley Guiliano LLP

(57) ABSTRACT

Methods and systems are provided for regenerating an after-treatment system of a vehicle. A first operational parameter of a first component of the after-treatment system is monitored and a second operational parameter, different to the first operational parameter, of a second component of the after-treatment system is monitored. It is determined if the first operational parameter of the first component is outside a first threshold range and if the second operational parameter is approaching a second threshold and, in response to the first operational parameter being outside the first threshold range and the second operational parameter being within the second threshold range, a regeneration sequence of the after-treatment system configured to regenerate at least the first component of the after-treatment system is initiated.

18 Claims, 9 Drawing Sheets

(56) References Cited

U.S. PATENT DOCUMENTS

2008/0271440 A1* 11/2008 Xu .................... F01N 3/208
  60/295
2012/0297750 A1* 11/2012 Sun .................... F01N 3/023
  73/23.33
2020/0291838 A1* 9/2020 Lambert ............... F02D 41/405

* cited by examiner

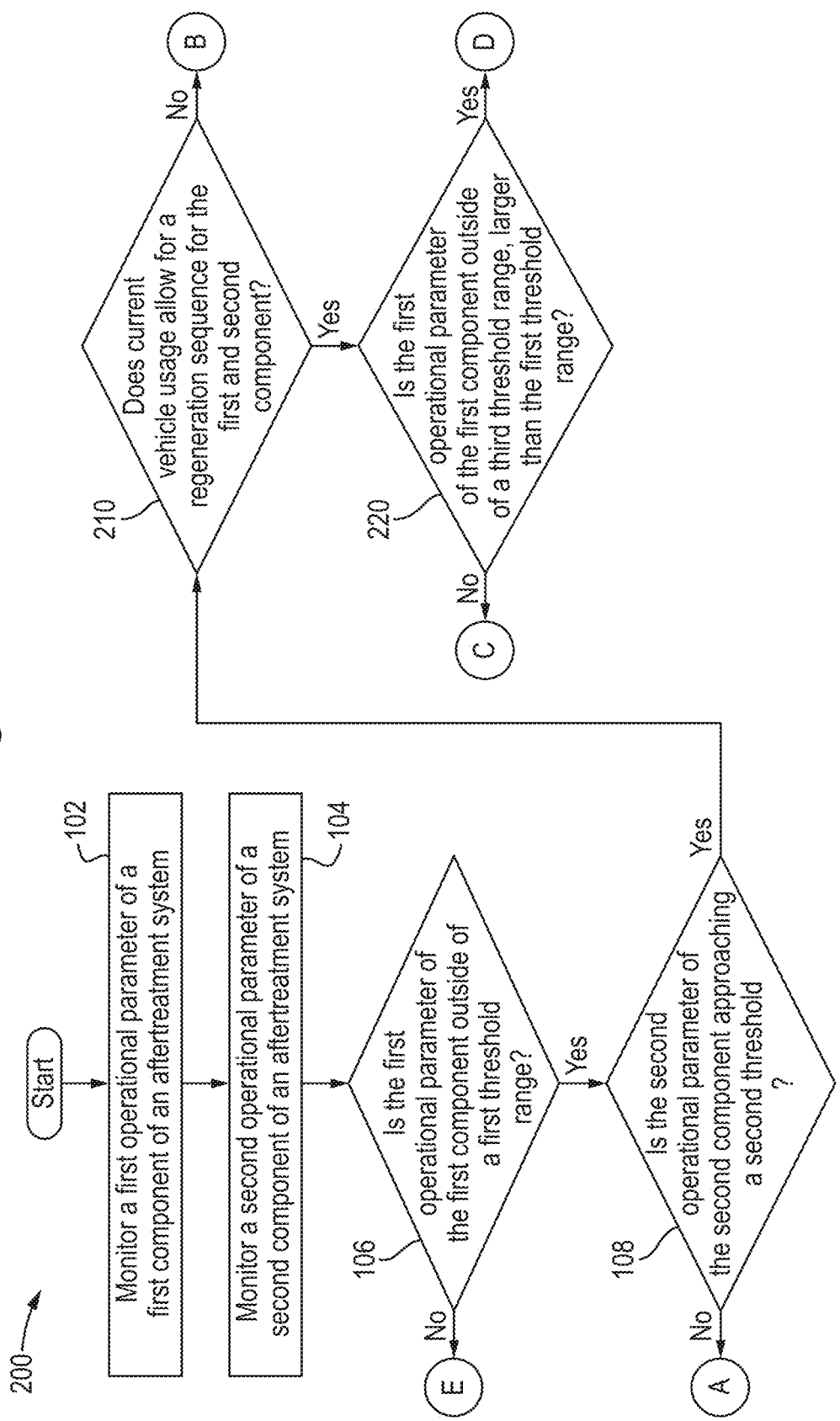

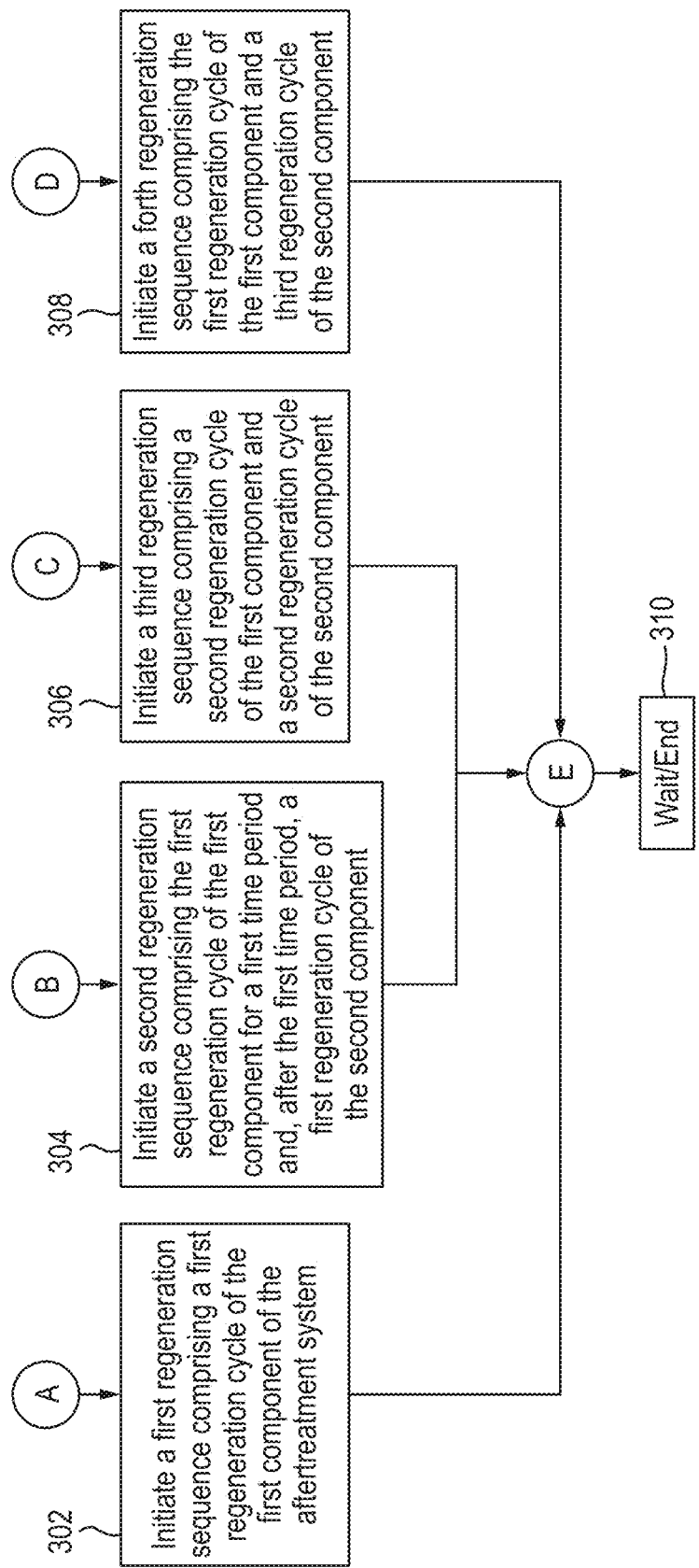

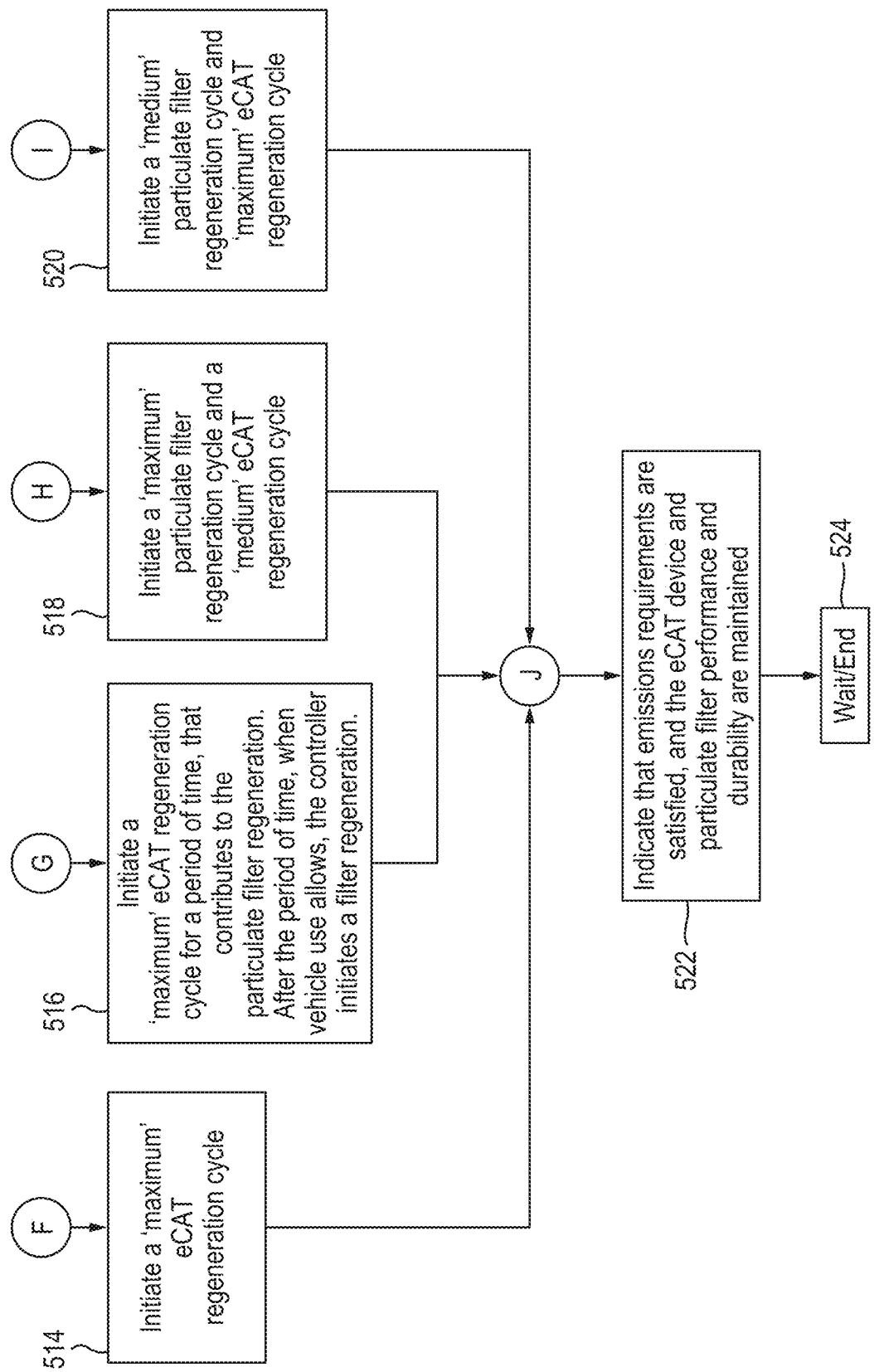

SYSTEMS AND METHODS FOR MAINTAINING AFTERTREATMENT CAPABILITY DURING VEHICLE LIFE

BACKGROUND

The present disclosure relates to systems and methods for maintaining after-treatment capability during vehicle life, more particularly, but not exclusively, to systems and methods for regenerating an after-treatment system of a vehicle to maintain after-treatment capability and emissions standards.

SUMMARY

Through consumer demand and local regulation, the need for reduced engine emissions has led to engine exhaust systems that comprise catalytic converters. Catalytic converters are a specific type of engine after-treatment system that reduces pollutants in exhaust gases by catalyzing a redox reaction. Catalytic converters are located downstream of the engine within a structure/housing in the exhaust system, that is designed to contain and direct exhaust gases over and/or through the catalytic converter. Like many after-treatment systems, catalytic converters require heating up to be most effective. As the demand for cleaner emissions increases and legislation requires a reduction in the pollutants produced by internal combustion engines, solutions involving exhaust after-treatment systems are increasingly desired.

To meet legislation emissions requirements (in jurisdictions such as the EU, the UK, or North America), internal combustion engine powertrains require electrically heated catalysts (eCATs) to assist catalyst light-off and to maintain optimal temperature for conversion. Current legislation proposals, for example in the EU7 emissions legislation, require 15 years or 240,000 km (whichever is achieved first) of vehicle life wherein emissions must be maintained. Typically, the current life expectancy of a vehicle is 10 years or 240,000 km. Therefore, extending the lifetime is expected to be critical to meet the current proposed legislation.

Due to the extended durability requirement, the performance of the eCAT element and the after-treatment filters may degrade. The eCAT device is positioned in the exhaust system, upstream of the majority of the after-treatment components and filters. Therefore, it is exposed to contaminants such as soot and particulates from the engine. Over time the eCAT element may become contaminated, which could change the resistance of the device and therefore change its output power. An increase in eCAT device resistance could result in reduced power output. A decrease in resistance could result in an eCAT power output that is too great, which may damage or degrade the eCAT device over time. Moreover, contamination of the eCAT device could potentially decrease the thermal transfer from the eCAT element to the gas, impacting catalyst heating efficiency. These factors risk maintaining eCAT device capability and thus emissions.

Particulate filters capture and store exhaust soot to reduce emissions from vehicles. A particulate filter periodically has to be emptied of soot or the soot has to be burned off to regenerate the DPF. Typically, particulate filter regeneration will be initiated in response to a trigger event, such as a contamination level of the filter. Both the eCAT and the particulate filter may therefore require regeneration, in some examples, the regeneration of each of the eCAT and particulate filters needs to be carried out at the same time. The regeneration of the eCAT can be assisted by also initiating a particulate filter regeneration if the conditions are appropriate to do so, which will be described in more detail below.

According to examples in accordance with an aspect of the disclosure, there is provided with a method of regenerating an after-treatment system of a vehicle. The vehicle may be, for example, a mildly hybrid electric vehicle (mHEV), although other Hybrid and High voltage applications that deploy applicable after-treatment systems such as a fully hybrid electric vehicle (FHEV) or a partially hybrid electric vehicle (PHEV) platforms are also suitable. The method comprises monitoring a first operational parameter of a first component of the after-treatment system and monitoring a second operational parameter, different to the first operational parameter, of a second component of the after-treatment system. The operational parameters may be, for example, one or more of electrical resistance of a component, a contamination level of a component, a temperature of a component, or a power or current draw of a component from a power source, for example, a hybrid battery/power source of the vehicle. The method further comprises determining if the first operational parameter of the first component is outside a first threshold range, determining if the second operational parameter is approaching a second threshold, and in response to the first operational parameter being outside the first threshold range and the second operational parameter being within the second threshold range, initiating a regeneration sequence of the after-treatment system configured to regenerate at least the first component of the after-treatment system.

In some examples, determining if the second operational parameter is within a second threshold range is carried out in response to the first operational parameter being outside the first threshold range. In some examples, the power output may be measured as energy output, i.e., the total amount of energy a battery can be expected to store and discharge at any given moment or over time.

In some examples, the method further comprises initiating a first regeneration sequence comprising a first regeneration cycle of the first component of the after-treatment system. In some examples, the second component is not regenerated as a part of the first regeneration sequence.

In some examples, determining if a current vehicle usage allows for a regeneration sequence of the after-treatment system configured to regenerate the first component and second component of the after-treatment system; and in response to the vehicle usage not allowing regeneration of the first and second component, initiating a second regeneration sequence comprising the first regeneration cycle of the first component for a first time period; and after the expiry of the first time period, initiating a first regeneration cycle of the second component.

In some examples, the method further comprises determining if the first operational parameter of the first component is outside of a third threshold range, larger than the first threshold range. In some examples, in response to the first operational parameter not being outside of the third threshold range, the method comprises initiating a third regeneration sequence comprising a second regeneration cycle of the first component and a second regeneration cycle of the second component.

In some examples, in response to the first operational parameter being outside of the third threshold range, the method further comprises, initiating a fourth regeneration sequence comprising the first regeneration cycle of the first component and a third regeneration cycle of the second component.

In some examples, the first component is an electrically heated catalyst, and the second component is a particular filter. In some examples, the operational parameter is at least one of a resistance, a temperature, a power draw, emissions output, or a current draw.

In some examples, the threshold of the operational parameter is configurable. In some examples, the regeneration sequence is carried out during low-flow conditions in the after-treatment system.

In some examples, the method further comprises providing heat to the catalyst until the catalyst reaches a threshold temperature; and starting an engine of the vehicle after the after-treatment system reaches the threshold temperature.

According to a second example in accordance with an aspect of the disclosure, there is provided with an after-treatment system of a vehicle comprising an electrically heated catalyst, electrically coupled to a power source, a particulate filter, and a controller, communicatively coupled to the electrically heated catalyst, the particulate filter, and the power source. The controller is configured to monitor the first operational parameter of the electrically heated catalyst, monitor a second operational parameter, different to the first operational parameter, of the particulate filter, determine if the first operational parameter is outside a first threshold range, determine if the second operational parameter is approaching a second threshold, and in response to the first operational parameter being outside the first threshold range and the second operational parameter being within the second threshold range, initiate a regeneration sequence of the after-treatment system configured to regenerate at least the electrically heated catalyst.

According to a third example in accordance with an aspect of the disclosure, there is provided with a vehicle. The vehicle comprises an after-treatment system. comprising an electrically heated catalyst, electrically coupled to a power source, a particulate filter, and a controller, communicatively coupled to the electrically heated catalyst, the particulate filter, and the power source.

According to a fourth example in accordance with an aspect of the disclosure, there is provided with a non-transitory computer-readable medium having instructions encoded thereon for carrying out the method of monitoring a first operational parameter of a first component of the after-treatment system; monitoring a second operational parameter, different to the first operational parameter, of a second component of the after-treatment system; determining if the first operational parameter of the first component is outside a first threshold range; determining if the second operational parameter is approaching a second threshold; and in response to the first operational parameter being outside the first threshold range and the second operational parameter being within the second threshold range, initiating a regeneration sequence of the after-treatment system configured to regenerate at least the first component of the after-treatment system.

For the avoidance of doubt, the system and methods for regenerating an after-treatment system of a vehicle, according to any of the examples described herein, may be used to reduce eCAT device resistance, reducing the number of high power output events, and therefore improve the life of components of an after-treatment system. Whilst the benefits of the systems and method may be described by reference to hybrid vehicles, it is understood that the benefits of the present disclosure are not limited to such types of vehicle, and may also apply to other types of vehicles, such as forklifts, trucks, buses, locomotives, motorcycles, aircraft and watercraft, and/or non-vehicle based systems that utilize a catalytic converter, such as electrical generators, mining equipment, stoves, and gas heaters.

These examples and other aspects of the disclosure will be apparent and elucidated with reference to the example(s) described hereinafter. It should also be appreciated that particular combinations of the various examples and features described above and below are often illustrative and any other possible combination of such examples and features are also intended, notwithstanding those combinations that are clearly intended as mutually exclusive.

BRIEF DESCRIPTION OF THE DRAWINGS

The above and other objects and advantages of the disclosures herein will be apparent upon consideration of the following detailed description, taken in conjunction with the accompanying drawings, in which:

FIG. 2 illustrates an example flow chart of determinations in a method for regenerating an after-treatment system of a vehicle, in accordance with at least one of the examples described herein.

FIG. 3 illustrates exemplary regeneration sequences to be carried out in response to the determinations of FIG. 2, in accordance with at least one of the examples described herein.

FIGS. 5A and 5B illustrate an example flow chart of determinations in a method for regenerating an after-treatment system of a vehicle and exemplary regeneration sequences to be carried out in response to the determinations, in accordance with at least one of the examples described herein.

DETAILED DESCRIPTION

Figure 1:
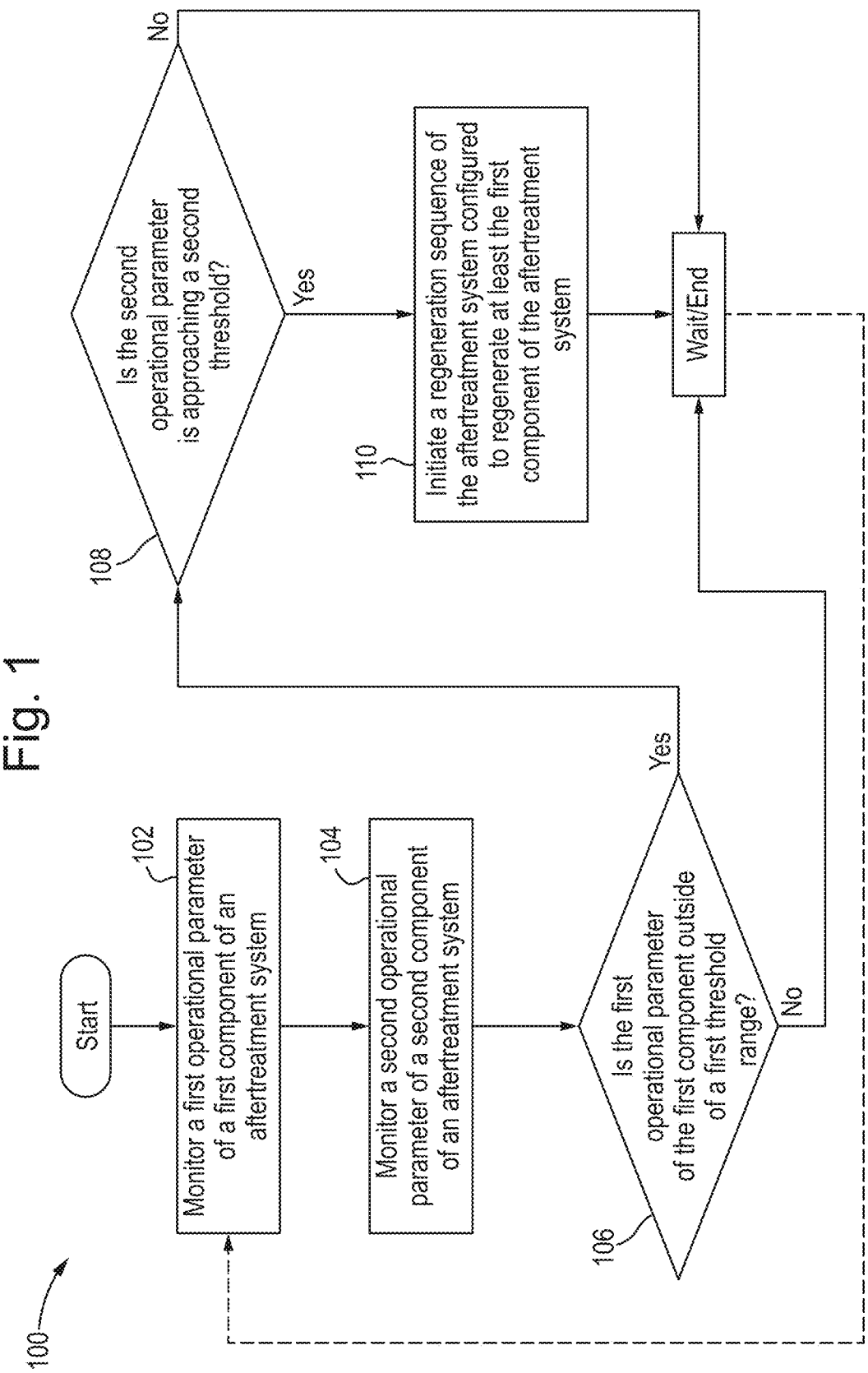
FIG. 1 illustrates an example flow chart of a method for regenerating an after-treatment system of a vehicle, in accordance with at least one of the examples described herein.

It should be understood that the detailed description and specific examples herein while indicating examples, are intended for purposes of illustration only and are not intended to limit the scope of the disclosure. These and other features, aspects, and advantages of the present disclosure will become better understood from the following description, appended claims, and accompanying drawings. It should be understood that the figures are merely schematic and are not drawn to scale. It should also be understood that the same or similar reference numerals are used throughout the Figures to indicate the same or similar parts.

As discussed briefly above, current regulations on emissions standards are requiring manufacturers of internal combustion engines to reduce the operating emissions from the engines they manufacture. These engines are used in any appropriate type of vehicle, such as an automobile, a motorbike, a marine vessel, or an aircraft. In particular, the vehicle may be any appropriate type of hybrid vehicle, such as a Hybrid Electric Vehicle (HEV), a Plug-in Hybrid Electric Vehicle (PHEV), a Mild Hybrid Electric Vehicle (mHEV), or any other vehicle having an engine and an electrified powertrain. Typically, hybrid vehicles use two or more distinct types of means to store energy, such as batteries to store electrical energy and gasoline/diesel to store chemical energy. The basic principle of hybrid vehicles is that the different types of motors have diverse efficiencies under different conditions, such as top speed, torque, or acceleration and therefore switching from one type of motor to another yields greater efficiencies than either one could have their own. However, under the proposed new emissions standards in markets such as, for example, the European Union (EU), North America, China, and the United Kingdom (UK), the increased efficiencies of hybrid vehicles may be insufficient to satisfy new emissions standards.

One solution to treat the toxic emissions of vehicles is the use of an exhaust after-treatment system. Exhaust after-treatment systems aim to reduce hydrocarbons, carbon monoxide, nitrous oxide, particulate matter, sulfur oxide, and volatile organic compounds such as chlorofluorocarbons. Examples of exhaust after-treatment systems include air injection (or secondary air injection), exhaust gas recirculation, catalytic converters, and particular filters. An exemplary exhaust after-treatment system is described with reference to FIG. 6.

Electrically heated catalysts, or eCATs, are a type of catalytic converter, which have been in use for a number of years. An eCAT typically comprises a heating element disposed within, or near to, a catalyst. eCATs are required in various use cases and will demand a power supply between 0-4 kW (0 to 4000 Watts) for example, depending on the use case. For example, the heating elements within the eCATs will have a thermal output of 0-4 kW (0 to 4000 Watts). An eCAT typically has low inductance and therefore the power output (or thermal power output) can be changed rapidly. The eCAT produces thermal power to warm the catalyst but consumes electrically current to produce the thermal power. The eCAT demand is supported by a hybrid powertrain electrical system in an HEV or PHEV platform. For example, in a cold start use case, the eCAT may demand its full rated power (e.g., ~4 kW) to maintain after-treatment temperature. Over time, the eCAT may become contaminated. The contamination may result in a reduction of the eCAT device resistance. A reduced resistance would result in increased power output, which could in turn age or degrade the performance of the eCAT device over time as it is exposed to more high power output events, which could risk the device durability and therefore emissions robustness over a vehicle platform lifetime of, for example, 15 years.

Particulate filters capture and store exhaust soot in order to reduce emissions from vehicles. A particulate filter periodically has to be emptied of soot or the soot has to be burned off to regenerate the Diesel Particulate Filter (DPF). There are nominally two types of regeneration processes; passive regeneration and active regeneration. Passive regeneration occurs when a vehicle is running at speed on long journeys, for example, motorway journeys, which causes an increase in the exhaust temperature to a level high enough to cleanly burn off the excess soot in the filter. Active regeneration is a process wherein additional thermal energy is input into the exhaust gas system. If, for example, the particulate filter and the eCAT are regenerated separately, the eCAT may be exposed to more high power output events that would be necessary, given some monitoring of operational parameters and regeneration event management between eCAT and particulate filter. In some examples, active regeneration will be initiated in response to a trigger event, such as a contamination level of the filter or time.

In particular, the systems and methods described herein are adapted to, at a high level, regenerate an eCAT device and to support after-treatment filter regeneration to maintain emissions performance over vehicle life. For clarity, this is irrespective of the method used to control the eCAT, i.e. via a DCDC controller or PWM driver. Accordingly, with regard to the below disclosures, the DCDC controlled eCAT is assumed as part of the system for various reasons which are not necessarily related to this proposed solution. However, a DCDC converter controlled eCAT device enables an additional advantage that can be utilised as a part of the below solutions. This is to modulate the voltage into the eCAT element to maintain the optimal eCAT power output irrespective of changes in resistance and to determine the resistance in the first instance, which will be discussed in more detail with regard to FIGS. 4A and 4B.

FIG. 1 illustrates an example flow chart of a method for regenerating an after-treatment system of a vehicle, in accordance with at least one of the examples described herein. In some examples, a method for regenerating an after-treatment system of a vehicle is provided. The method may carry out a process, such as Process 100, which starts at step 102. At step 102, a first operational parameter of a first component of the after-treatment system is monitored.

At step 104, the system monitors a second operational parameter, different to the first operational parameter, of a second component of the after-treatment system. In some examples, the order of the steps in FIG. 1 is for illustrative purposes and, in some examples, step 104 may precede 102.

At step 106, the system determines if the first operational parameter of the first component is outside a first threshold range. For example, contamination, such as soot on an eCAT, could reduce the resistance of the first component, while the first component ageing could result in the resistance increases over time.

In response to the answer to step 106 being no, the process 100 ends or, optionally, a waiting period is initiated before returning to step 102. In response to the answer to step 106 being yes, process 100 continues on to step 108.

At step 108, the system determines if the second operational parameter is approaching a second threshold. In response to the answer to step 108 being no, the process 100 ends or, optionally, a waiting period is initiated before returning to step 102. In response to the answer to step 108 being yes, process 100 continues on to step 110.

At step 110, the system initiates a regeneration sequence of the after-treatment system configured to regenerate at least the first component of the after-treatment system. In some examples, utilizing the eCAT element to support filter regeneration, may have benefits in terms of extending the life of the particulate filter due to a reduction of time residency at extremely high temperature (during regeneration) over the life of the vehicle. In some examples, using the eCAT power to support filter regeneration may reduce or remove the need to post inject fuel, improving engine and engine oil durability (e.g., less fuel in oil) thus extending oil service interval and potentially enabling a reduced oil fil volume (e.g., less weight and cost) and less particulate filter volume (e.g., less cost), less package/weight impact, improved durability and improved customer attributes.

FIG. 2 illustrates an example flow chart of determinations in a method for regenerating an after-treatment system of a vehicle, in accordance with at least one of the examples described herein. FIG. 3 illustrates exemplary regeneration sequences to be carried out in response to the determinations of FIG. 2, in accordance with at least one of the examples described herein. In some examples, an after-treatment system of a vehicle comprising a first component and a second component, wherein the first and second components are communicatively coupled to a controller, is provided. In some examples, the controller of the after-treatment system carries out a process, such as Process 200. Process 200 begins at step 102.

At step 102, the system monitors a first operational parameter of a first component of the after-treatment system is monitor. At step 104, the system monitors a second operational parameter, different to the first operational parameter, of a second component of the after-treatment system. As briefly described previously, the operational parameters may be, for example, one or more of electrical resistance of a component, a contamination level of a component, a temperature of a component, or a power or current draw of a component from a power source, for example, a hybrid battery/power source of the vehicle. For example, the resistance of an eCAT of the after-treatment system, a contamination level of a particulate filter of an after-treatment system, or a power or current draw of the eCAT from a vehicle power source such as a hybrid battery.

At step 106, the system determines if the first operational parameter of the first component is outside a first threshold range. In response to the answer to step 106 is no, process 200 moves on to step E, as described with reference to FIG. 3, below. In response to the answer to step 106 being yes, process 200 continues to step 108.

At step 108, the system determines if the second operational parameter is approaching a second threshold. In response to the answer to step 108 is no, process 200 moves on to step A. Step A, shown on FIG. 3 leading to step 302, describes initiating a first regeneration sequence comprising a first regeneration cycle of the first component of the after-treatment system. In some examples, the first component is an eCAT and the second component is a particulate filter. While reference will primarily be made to an eCAT and a particulate filter in the examples herein, it should be understood that this is not intended to be a limiting factor. In some examples, the first regeneration cycle of the first component is a maximum power output eCAT regeneration cycle, as described more with regard to FIG. 5B.

In response to the answer to step 108 being yes, process 200 continues to step 210. At step 210, the system determines if the current vehicle usage and condition allows for a regeneration sequence for the first and components. In some examples, the current vehicle usage may be an exhaust low flow rate, or, engine low load use. There are some scenarios in which particulate filter regeneration is not permitted. For example, if there is a general vehicle fault resulting in a malfunction indicator lamp (MIL), the vehicle enters a limp home mode, or if there is very low fuel (e.g., the fuel indicator lamp is on) remaining in the tank.

In another example, if the vehicle is in stop/start traffic, the load on the engine is low and thus less exhaust heat/gas will flow through the particulate filter, not supporting a full regeneration. Equally, a particulate filter regeneration event may have a fixed time to complete, therefore a short journey will prevent the regen event from completing. In other words, highway or motorway driving is the optimal usage to complete a regen event, therefore, in some examples, the vehicle usage and/or condition may determine if a regeneration sequence is possible to be completed at that time. In some examples, 'current usage' refers to the type of driving and thus the load on the engine. Short journeys or stop start traffic (periods with low load in general) will not allow full regeneration.

In response to the answer to step 210 is no, process 200 moves on to step B. Step B, shown on FIG. 3 leading to step 304, describes initiating a second regeneration sequence comprising the first regeneration cycle of the first component for a first time period and, after the first time period, a first regeneration cycle of the second component. In some examples, the first time period expires when the vehicle is in a low flow and/or low load use case. Therefore, in some examples, an eCAT cleaning cycle can reduce the power throughput and duration of a filter regeneration sequence, once vehicle conditions allow it to begin. In some examples, the first regeneration cycle of the second component is a high or maximum power output of the second component, as described more with regard to FIG. 5B.

In response to step 210 is yes, process 200 moves on to step 220. At step 220 the system determines if the first operational parameter of the first component is outside of a third threshold range, larger than the first range.

In response to the answer to step 220 is no, process 200 moves on to step C. Step C, shown on FIG. 3 leading to step 306, describes initiating a third regeneration sequence comprising a second regeneration cycle of the first component and a second regeneration cycle of the second component. In some examples, due to the proximity of a particulate filter in an after-treatment system to an eCAT, a filter regeneration cycle may also, partially, regenerate the eCAT. Therefore, if a 'full' particulate filter regen is required, but the measured eCAT resistance is just outside of the predetermined resistance threshold, less eCAT power or eCAT activation time may be required to conduct the eCAT regeneration cycle. Therefore, if the measured resistance is close to but just outside the threshold, less eCAT power in the regeneration cycle or a reduction in the eCAT regeneration duration, will be required as the particulate filter regeneration will contribute to eCAT regeneration. Therefore, the particulate filter regeneration and eCAT regeneration/cleaning cycle could be utilized in a combined strategy for cleaning/regeneration.

In response to step 220 is yes, process 200 moves on to step D. Step D, shown on FIG. 3 leading to step 308, describes initiating a fourth regeneration sequence comprising the first regeneration cycle of the first component and a third regeneration cycle of the second component. As stated above, the eCAT regeneration cleaning and filter regeneration cycles complement each other. In some examples, the eCAT resistance measurement or aftertreatment temperature is significantly outside a predetermined range or target, therefore a maximum eCAT regeneration cycle is deployed to ensure the eCAT is cleaned, but in turn, this also partially regenerates the particulate filter, hence less filter regeneration power output and/or duration is required. The same is true for a maximum particulate filter regeneration cycle, which partially regenerates the eCAT.

Figure 4A:
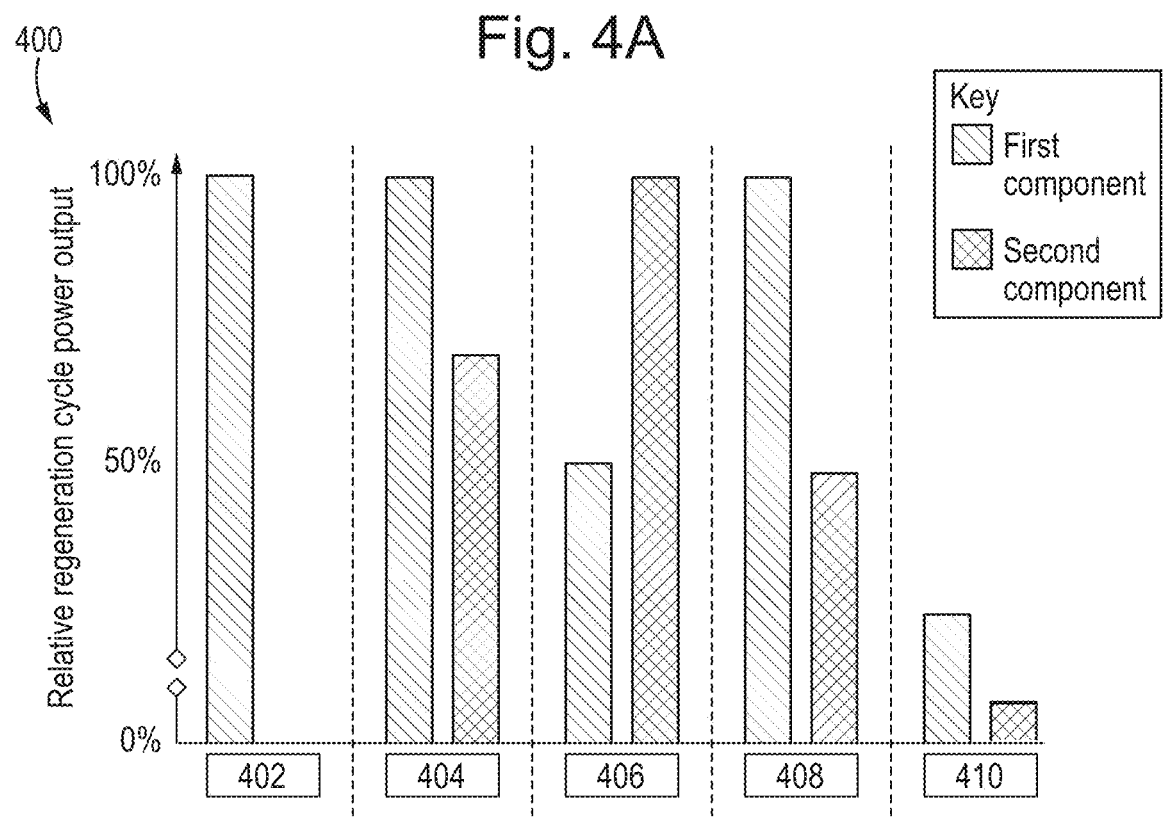
FIGS. 4A and 4B illustrate graphs of the relative component device power and power output as a function of input voltage, in accordance with at least one of the examples described herein.
Figure 4B:
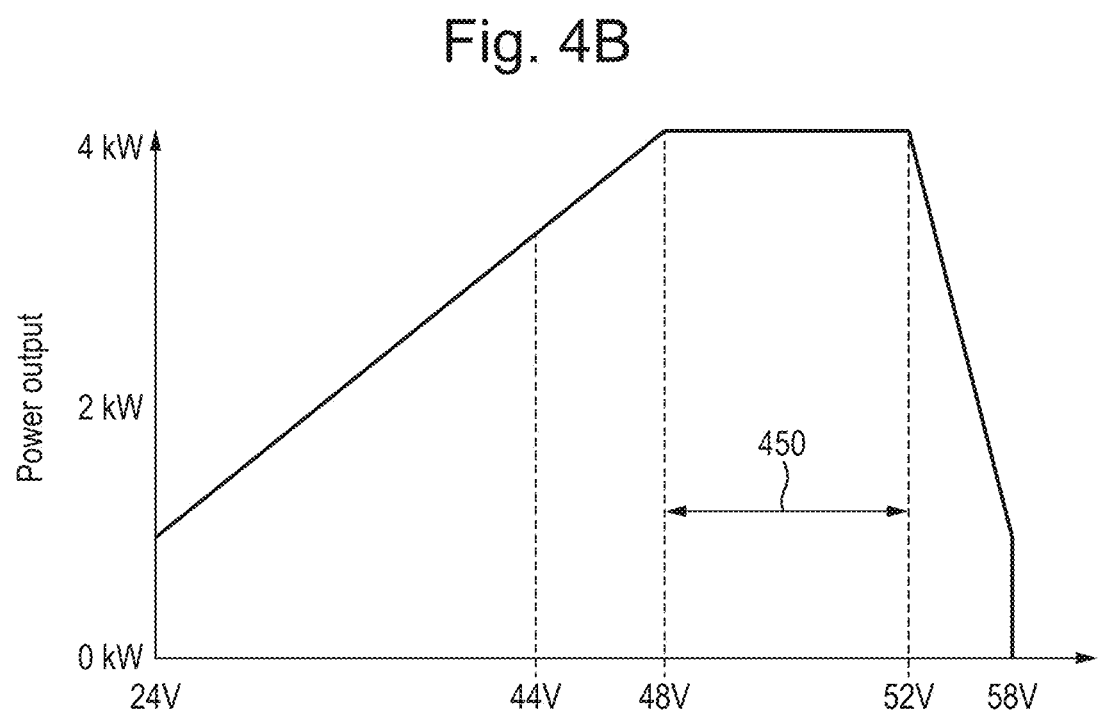

FIGS. 4A and 4B illustrate graphs of the relative component device power and power output as a function of input voltage, in accordance with at least one of the examples described herein. Starting with FIG. 4A, which shows a relative regeneration cycle power output of each of the steps A-D from FIG. 3. For example, step 302, which describes initiating a first regeneration sequence comprising a first regeneration cycle of the first component of the after-treatment system, is represented by the bar 402 in chart 400.

The two bars 404 represent step 304, which describes initiating a second regeneration sequence comprising the first regeneration cycle of the first component for a first time period and, after the first time period, a first regeneration cycle of the second component. In some examples, the first regeneration cycle of the second component is a maximum power (not shown). In some examples, the first regeneration cycle of the second component is less than maximum power (as shown in FIG. 4A).

In some examples, there is a target temperature to be achieved by the second component. For example, to burn a contaminant in the second component, it may be necessary to achieve a temperature in excess of 600 degrees Celsius, for example. Therefore, in some examples, the power provided by the first regeneration cycle of the second component, after the first period, depends on a delta temperature to a target temperature. In some examples, maximum power of the second component will be needed, however the duration will be reduced due to the first regeneration cycle of the first component for the first period.

The two bars 406 represent step 306, which describes initiating a third regeneration sequence comprising a second regeneration cycle of the first component and a second regeneration cycle of the second component.

The two bars 408 represent step 308, which describes initiating a fourth regeneration sequence comprising the first regeneration cycle of the first component and a third regeneration cycle of the second component.

It should be borne in mind that, in some examples, such as the two bars 404 that represent step 304, there may be a time delay between the regeneration sequences for the first and second component. FIG. 4A does not capture this, but it is intended to be a part of a any relevant regeneration sequence. Referring to the examples shown in FIG. 4A, if the same amount of contaminant needs to be burnt off, bars 404 that represent step 304 will be a longer process compared to bars 408 that represent step 308; because there is a wait time in step 304 as described above. However, the wait time for step 304 would be reduced vs a system with the teachings of the present disclosure due to the assistance of the first component in regeneration sequence.

The two bars 410 represent a nominal vehicle operation state of the first and second components and are shown for illustrative comparison to the modalities shown with regard to bars 402- 408. In some examples, there may be no power provided to the second component during nominal vehicle operations. In other examples, such as that shown, there may be a small amount of power provided, based on an at least one operational parameter of the second component (e.g., a contamination level and a target temperature).

FIG. 4B shows an exemplary power-voltage graph for a DCDC converter, such as a buck-boost converter, or the like. In a hybrid vehicle, for example, a DCDC may be used to convert electrical power to support the low voltage (e.g., 12V) system and components of the vehicle. However, a second DCDC is adopted to modulate eCAT power, avoiding rapid disturbance of the 48V bus, and enabling coordinated load matching between eCAT and belt-integrated starter-generator (BISG) to avoid excessive or additional battery throughput. The DCDC enables the modulation of voltage into the eCAT. Therefore, the input voltage can be changed to accommodate changes to eCAT device resistance and to maintain eCAT power output.

In some examples, the DCDC is particularly useful as the eCAT ages over time, due to high power output events for example, wherein the resistance may change irrespective of the contamination and or soot. Therefore, the DCDC can be used to modulate the input voltage to the eCAT device to match the minimum required eCAT power to maintain emissions requirements. Once the efficiency or the resistance change has been measured via the DCDC, the input voltage can be manipulated accordingly to maintain optimal target eCAT device output power.

DCDC control can ensure the power output of the eCAT is maintained at rated power irrespective of input voltage. As the resistance increases, the voltage can increase accordingly to maintain the output power. In this way, emissions legislation is maintained over time. The eCAT is a dynamically controlled load, with low inductance and therefore it has a quick response. Consequently, utilizing the DCDC controller for eCAT avoids the resulting transient loads on the hybrid system. The DCDC control of the eCAT results in numerous advantages and is part of the system for various reasons, however, in particular, it can be utilized to modulate the input voltage to the eCAT device as the resistance increases to maintain the eCAT output power.

Accordingly, in some examples, an after-treatment system of a vehicle comprising an electrically heated catalyst, electrically coupled to a power source, a particulate filter, and a controller, communicatively coupled to the electrically heated catalyst, the particulate filter, and the power source. The controller is configured to monitor a first operational parameter of the electrically heated catalyst; monitor a second operational parameter, different to the first operational parameter, of the particulate filter; determine if the first operational parameter is outside a first threshold range; determine if the second operational parameter is approaching a second threshold; and in response to the first operational parameter being outside the first threshold range and the second operational parameter being within the second threshold range, initiate a regeneration sequence of the after-treatment system configured to regenerate at least the electrically heated catalyst.

In some examples, the control module is further configured to initiate a first regeneration sequence comprising a first regeneration cycle of the electrically heated catalyst; and wherein the particulate filter is not regenerated as a part of the first regeneration sequence. In some examples, the control module is further configured to determine if a current vehicle usage allows for a regeneration sequence of the after-treatment system configured to regenerate the first component and second component of the after-treatment system; and in response to the vehicle usage not allowing regeneration of the first and second component, initiating a second regeneration sequence comprising the first regeneration cycle of the first component for a first time period; and after the expiry of the first time period, initiating a first regeneration cycle of the particulate filter.

In some examples, the controller is further configured to determine if the first operational parameter of the electrically heated catalyst is outside of a third threshold range, larger than the first threshold range; and in response to the first operational parameter not being outside of the third threshold range, initiating a third regeneration sequence comprising a second regeneration cycle of the electrically heated catalyst and a second regeneration cycle of the particulate filter. In some examples, the controller is further configured to, in response to the first operational parameter being outside of the third threshold range, initiate a fourth regeneration sequence comprising the first regeneration cycle of the electrically heated catalyst and a third regeneration cycle of the particulate filter.

In some examples, the operational parameters may be, for example, one or more of an electrical resistance of a component, a contamination level of a component, a temperature of a component, or a power or current draw of a component from a power source, for example, a hybrid battery/power source of the vehicle. In some examples, the one or more operational parameters comprise at least one of an engine temperature; an exhaust gas flow rate through the after-treatment system; a maximum thermal energy output from a heating module of the after-treatment system; and/or an amount of particulate matter in the after-treatment system.

In some examples, the threshold of the operational parameter is configurable, the regeneration sequence comprises increasing a power delivered to the electrically heated catalyst; and/or the regeneration sequence is carried out during low-flow conditions in the after-treatment system.

Figure 5A:
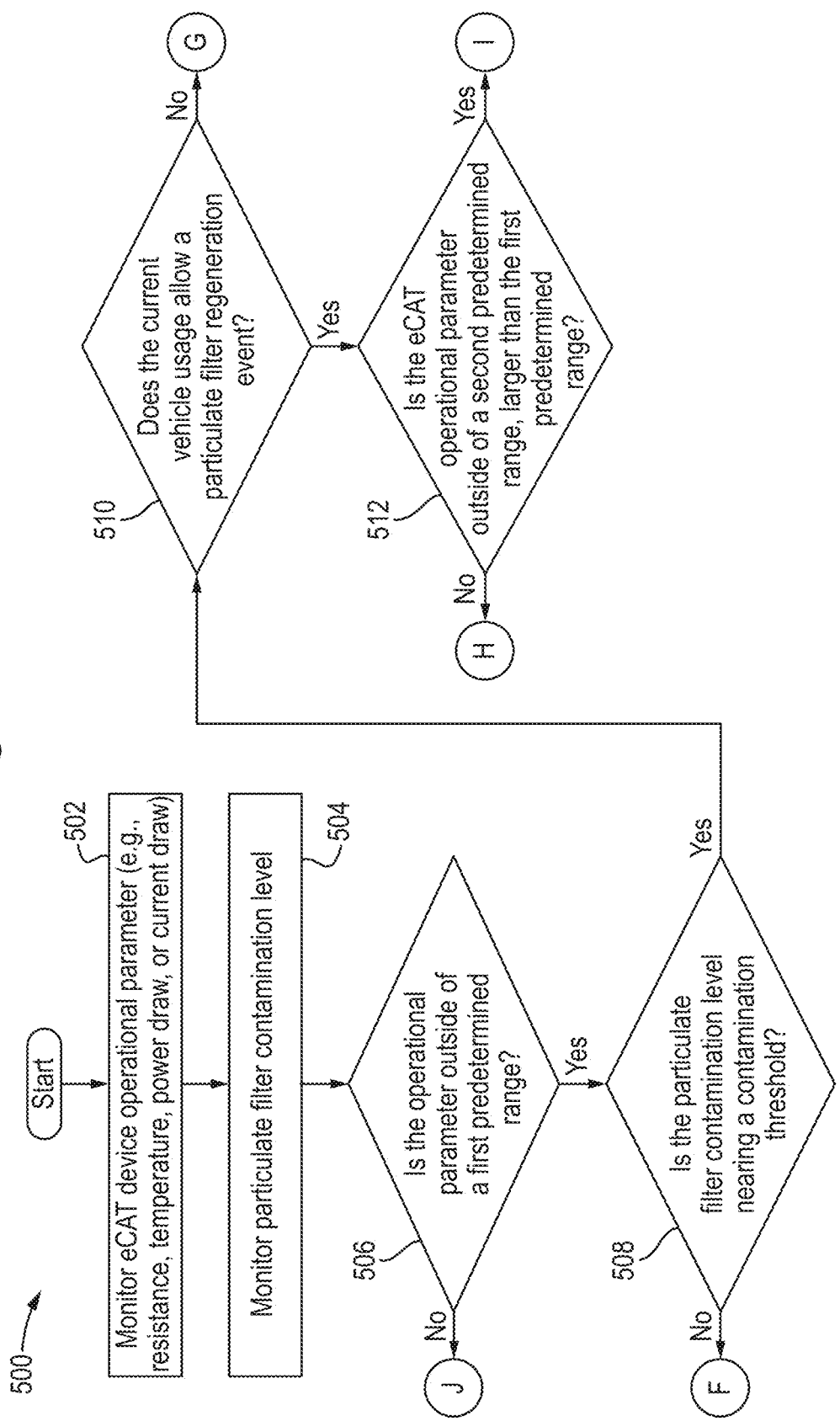

FIGS. 5A and 5B illustrate an example flow chart of determinations in a method for regenerating an after-treatment system of a vehicle and exemplary regeneration sequences to be carried out in response to the determinations, in accordance with at least one of the examples described herein. In some examples, an after-treatment system of a vehicle comprises an electrically heated catalyst, electrically coupled to a power source, a particulate filter, and a controller, communicatively coupled to the electrically heated catalyst, the particulate filter, and the power source. The controller may be configured to carry out process 500, which starts at step 502. Process 500 is intended to show a series of decisions that may be made in relation to the methods discussed herein.

At step 502, the system monitors a first operational parameter of a first component of the after-treatment system is monitor. At step 504, the system monitors a second operational parameter, different to the first operational parameter, of a second component of the after-treatment system. In some examples, the resistance of the eCAT element and/or its operating temperature is monitored. The resistance may be determined by using the measured voltage over the eCAT device and the DCDC converter eCAT controller output current (i.e., the current supplied to the eCAT device). In some examples, the operating temperature of the eCAT device is estimated and could in part be based upon the measurements from Exhaust Gas Temperature (EGT) sensors which may be either side of the eCAT device. EGT Sensors on either side of the eCAT may not be applicable in all applications. For example, EGT sensors are more likely in diesel applications and could be used to determine a change in eCAT element/heater operating temperature as a result of device ageing or contamination.

At step 506, the system determines if the first operational parameter of the first component is outside a first threshold range. In response to the answer to step 506 is no, the process 500 moves on to step J, as described with reference to FIG. 5B, below. In response to the answer to step 506 being yes, the process 500 continues to step 508.

At step 508, the system determines if the second operational parameter is approaching a second threshold. In response to the answer to step 508 is no, the process 500 moves on to step F. Step F, shown on FIG. 5B leading to step 514, describes initiating a maximum eCAT regeneration cycle. In response to the answer to step 508 being yes, the process 500 continues on to step 510. A 'maximum' eCAT regeneration cycle reduces the need for 'maximum' filter regeneration. The partial filter regen and max eCAT cleaning cycle combine to regenerate both the eCAT and filter. Due to the monitored operational parameter, for example, a measured resistance, being far from the threshold, full eCAT regeneration power is required in this use case regardless of the requirements of the particulate filter. In some examples, 'maximum' means to activate or increase the eCAT device power output to a max rated power (e.g., ~4 kW), for a predetermined time period.

In some examples, depending on the application, the measured resistance of the eCAT device and or the measured exhaust temperatures and estimated element operating temperature can be used to initiate the regeneration of the eCAT device. If the resistance and or temperatures are less or greater than a predetermined range, the eCAT device can be activated or its output power can be increased, therefore increasing its temperature, to regenerate the accumulated soot and or contamination.

At step 510 the system determines if the current vehicle usage allows for a regeneration sequence for the first and components. In some examples, the eCAT can be regenerated either by initiating a Diesel Particulate Filter (DPF) regeneration or more conveniently applying high power electrical heating during low flow conditions (i.e. idle), which will ensure rapid heating up of the heater element above ~600° C., which will, in lean (i.e., oxygen-rich) exhaust, lead to soot burn off from the heater. As part of the implementation of the solution a control module such as the PCM will decide if it is more appropriate to carry out one of a number of steps, e.g. steps 302 to 308 of FIG. 3 or steps 514-520 of FIG. 5B.

In response to the answer to step 510 is no, process 500 moves on to step G. Step G, shown on FIG. 5B leading to step 516, describes initiating a 'maximum' eCAT regeneration cycle for the first period of time. After the first period of time, when vehicle use allows, the controller initiates a filter regeneration cycle. In response to step 510 is yes, process 500 moves on to step 512.

At step 512 the system determines if the first operational parameter of the first component is outside of a third threshold range, larger than the first range. In response to the answer to step 512 is no, process 500 moves on to step H. Step H, shown on FIG. 5B leading to step 518, describes initiating a 'maximum' particulate filter regeneration cycle and a 'medium' eCAT regeneration cycle.

In response to step 512 is yes, process 500 moves on to step I. Step I, shown on FIG. 5B leading to step 520, describes initiating a 'medium' particulate filter regeneration cycle and 'maximum' eCAT regeneration cycle. In some examples, a 'medium' regeneration cycle means to activate or increase the eCAT device power output to half of the maximum power output of the max rated power (e.g., ~2 kW for a ~4 kW maximum power rated calculator) for a predetermined time period.

In some examples, a combination of e.g., activating the eCAT or increasing the eCAT output power in conjunction with DPF regeneration, results in improved particulate filter (e.g., DPF) regeneration performance, i.e. a reduced DPF regeneration duration, whilst regenerating the eCAT element to reduce its resistance. Utilizing the eCAT element to support DPF regeneration, may have benefits in terms of extending the life of the DPF due to a reduction of time residency at extremely high temperature (i.e., during regeneration) over the life of the vehicle.

The above methods and systems are implemented to decide if it is more appropriate to: a) initiate DPF regeneration to clean the eCAT element if the conditions to conduct DPF regeneration have been achieved or are close to being achieved (for efficiency reasons). It could be assumed that if the eCAT element is contaminated with soot and requires regeneration, then the DPF may also require regeneration; b) activate or increase the eCAT device power to clean the eCAT element only, if the DPF regeneration is not appropriate depending on the use case. For example, in gasoline applications in which the eCAT is only expected to be deployed for short durations, the cleaning cycle may be more desirable to ensure the device resistance remains within a target threshold; or c) a combination of both options above, i.e., activate the eCAT or increase the eCAT output power in conjunction with DPF regeneration. This would result in improved DPF regeneration performance, i.e. a reduced DPF regeneration duration whilst cleaning the eCAT element to reduce its resistance. Utilizing the eCAT element to support DPF regeneration, has additional benefits in terms of extending the life of the DPF due to a reduction of time residency at extremely high temperature (during regeneration) over the life of the vehicle.

After steps 514-520, process 500 may move on to step J, shown on FIG. 5B leading to step 522. At step 522, an indication that the emissions requirements are satisfied and the eCAT device and particular filter performance and durability are maintained. After step 522, process 500 may continue to step 524, wherein a waiting period is initiated before process 500 repeats.

Figure 6:
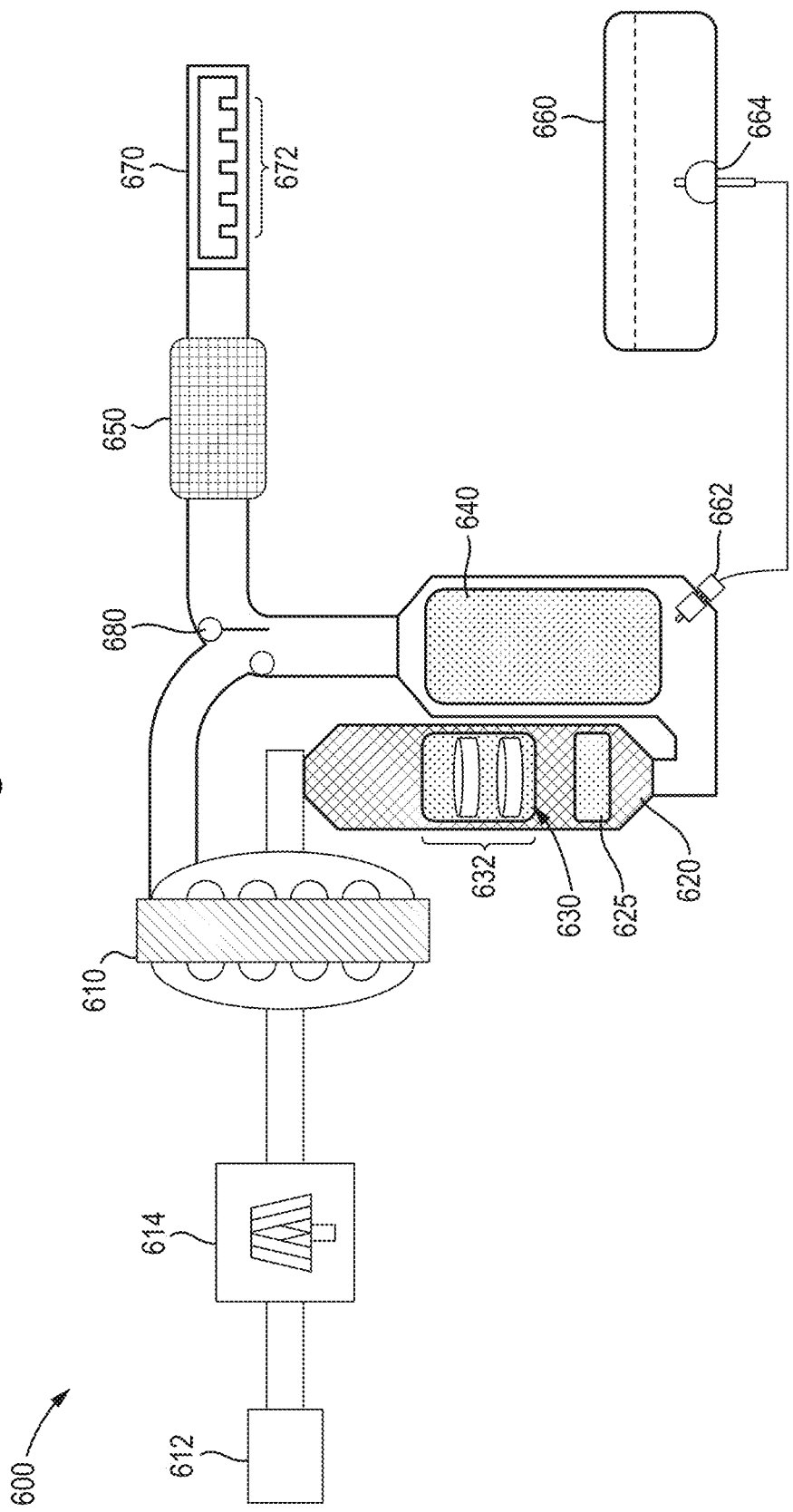
FIG. 6 illustrates an exemplary exhaust system comprising an after-treatment system, in accordance with at least one of the examples described herein.

Note that the description above focuses on the diesel application, including DPF regeneration and sooty deposits, in some examples, the after-treatment system further comprises Exhaust Gas Temperature (EGT) Sensors as shown in FIG. 6. EGT sensors may be located before, after, or before and after the eCAT device. Despite predominately focusing on Diesel particulate filters, this strategy could be utilized on gasoline applications in a similar manner, including a Gasoline Particulate Filter (GPF).

FIG. 6 illustrates an exemplary exhaust system 600 comprising an engine 610 and an after-treatment system, comprising an eCAT 620. In some examples, the eCAT 620 comprises a catalyst 625 that is provided heat by the methods as described herein. In some examples, and as shown in FIG. 6, there is provided with an air-box 612 connected to a compressor 614 to draw air from the atmosphere. The airbox 612 and compressor 614 are fluidly connected to engine 610 and the after-treatment system to transfer thermal energy from a plurality of heating elements 632 disposed within the heating module 630 within the after-treatment system to the rest of the after-treatment system (e.g., to the catalyst 625). In some examples, to support local emissions regulations, additional systems such as an e-compressor 614 may be required. In particular, during a low flow exhaust gas situation, additional fans or the like to increase oxygen through the after-treatment system to assist in soot burn off may be required.

In some examples, there is a diesel particulate filter 640 downstream of engine 610. A diesel particulate filter (DPF) is a filter that captures and stores exhaust soot, coke, and/or char, collectively referred to as particulate matter. The DPF is another form of after-treatment utilized to reduce emissions from diesel cars. DPFs have a finite capacity, the trapped particulate matter periodically has to be emptied or 'burned off' to regenerate the DPF, which an eCAT may also be used to assist with. This regeneration process cleanly burns off the excess particular matter deposited in the filter, reducing the harmful exhaust emission. In some examples, the regeneration process may be initiated in response to predicting that there will be no increase in torque demand. For example, if the amount of particular matter within the after-treatment system is determined to be above a threshold and a regeneration process is required, the after-treatment system can wait until a prediction that no increase in torque demand will be made by the driver to regenerate the after-treatment system (e.g., the DPF).

In some examples, wherein the vehicle's internal combustion engine is fuelled by gasoline, there is a gasoline particulate filter (GPF), which would replace the DPF as described above, downstream of engine 610. Similar to a DPF, a GPF is a filter that captures and stores exhaust soot, coke, and/or char, collectively referred to as particulate matter. The GPF is another form of after-treatment utilized to reduce emissions from gasoline vehicles. GPFs have a finite capacity, the trapped particulate matter periodically has to be emptied or 'burned off' to regenerate the GPF, which an eCAT may also be used to assist with. This regeneration process cleanly burns off the excess particular matter deposited in the filter, reducing the harmful exhaust emission. In some examples, the regeneration process may be initiated in response to predicting that there will be no increase in torque demand. For example, if the amount of particular matter within the after-treatment system is determined to be above a threshold and a regeneration process is required, the after-treatment system can wait until a prediction that no increase in torque demand will be made by the driver to regenerate the after-treatment system (e.g., the GPF).

In some examples, there is also provided with a selective catalytic reduction (SCR) 650 system. An SCR is another emissions control technology system that injects a liquid-reductant agent through a special catalyst into the exhaust stream of engines, in particular diesel engines. The reductant source is usually automotive-grade urea, otherwise known as diesel exhaust fluid (DEF). The DEF sets off a chemical reaction that converts nitrogen oxides into nitrogen, water, and low amounts of carbon dioxide ($CO_2$), which is then expelled through the vehicle tailpipe 670. The DEF may be stored in a DEF tank 660. The DEF may be distributed through several pumps and valves 662 and 664, as shown in FIG. 6. The number of pumps and valves 662 and 664 are for illustration purposes and additional pumps and valves 662 and 664 may be located throughout the exhaust and/or after-treatment system. The location of the pumps and valves 662 and 664 are similarly for illustration purposes and the location of the pumps and valves 662 and 664 can be different from that shown in FIG. 6.

In some examples, the exhaust system comprises several sensors 672 to detect the flue gas containing oxides of nitrogen (NOx) and oxides of sulfur (SOx), to ensure the final emissions are within a regulation amount. Euro 5 exhaust emission legislation and Euro 6 exhaust emission legislation, have effectively made it mandatory for DPFs, DEF, and SCRs to meet the emissions standards. However, future emission legislation, such as Euro 7, such technology alone may not be sufficient. The systems and examples described herein may replace, or work in conjunction with DPFs, DEF, and SCRs and meet the future standards.

In some examples, the exhaust system comprises an exhaust gas recovery system, which is enabled by an EGR switch 680. The EGR switch 680 enables some or all exhaust gas, or the thermal energy of the exhaust gas, to be recirculated through the exhaust system to further compound the heating effect of the heating elements 632 within the heating module 630.

Figure 7:
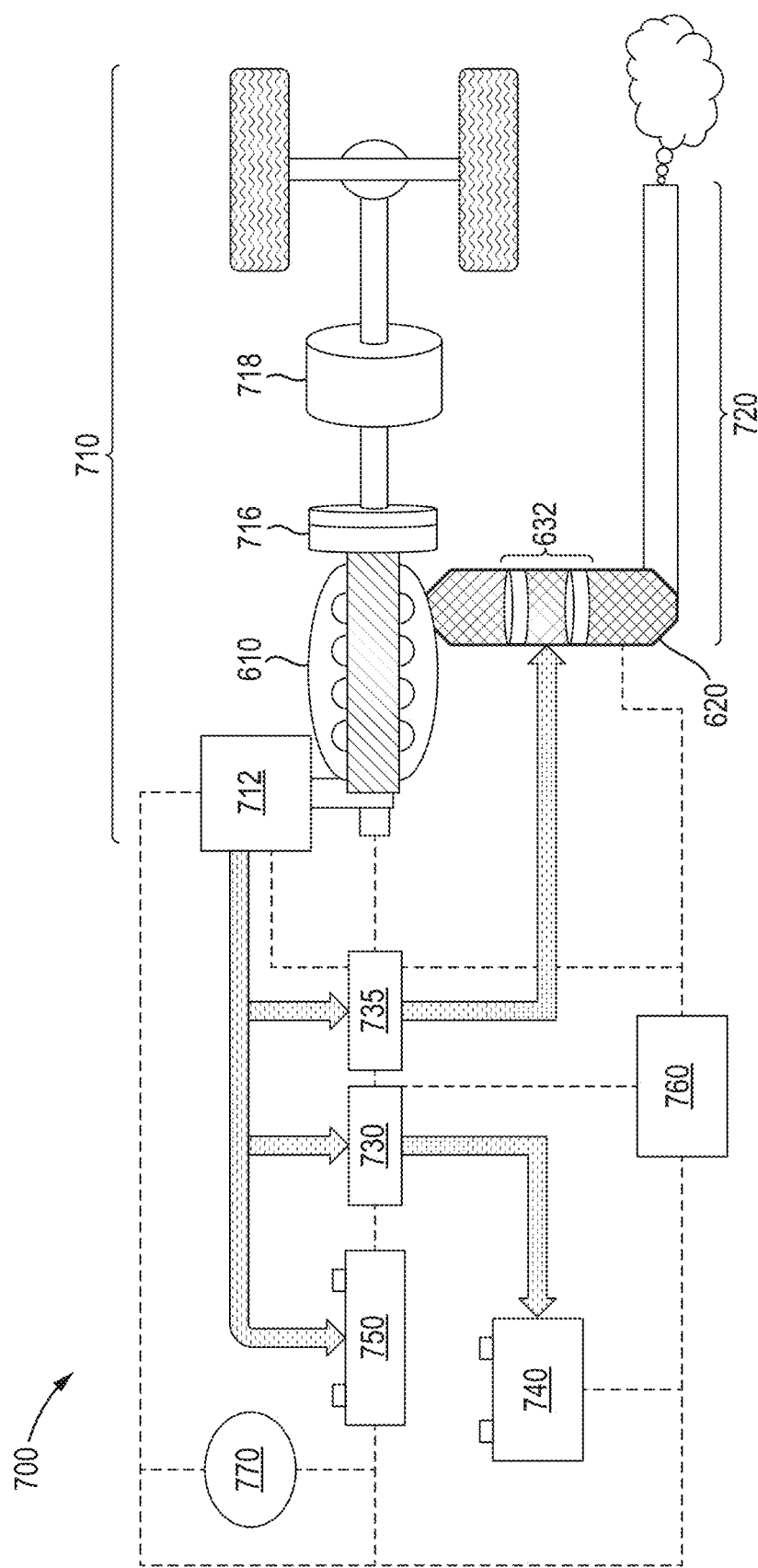
FIG. 7 illustrates a block diagram representing an electrical power control system for a hybrid vehicle, in accordance with at least one of the examples described herein.

FIG. 7 shows a block diagram representing an electrical power control system 700 for a hybrid vehicle. In the example shown in FIG. 7, the power control system 700 is for an exemplary mHEV system architecture, in accordance with at least one of the examples described herein. Shown in FIG. 7 is a belt-integrated starter-generator (BISG) 712, which is a device that may apply positive torque and assist the engine in reducing the amount of work it has to do, or, in some examples, apply negative torque to generate electrical energy. The BISG 712 may be referred to as a motor generator. The BISG 712 is integrated into the drive train 710, along with engine 610, clutch 716, and transmission 718. In some examples, the BISG 712 replaces a conventional non-hybrid engine's low voltage (e.g., 12V) alternator. In some examples, the BISG 712 transmits torque to the engine's crankshaft when it's operating as a hybrid drive motor, and the crankshaft transmits torque back to the BISG 712 when it operates as a generator, converting kinetic energy from the moving vehicle back into electricity, operating as a conventional alternator.

In some examples, engine 610 has an exhaust system 720 comprising an eCAT 620. In the example shown in FIG. 7, a DC-DC converter 730 is electrically connected to a low voltage (e.g., 12V) battery and bus 740, which is configured to supply electrical power to one or more low voltage accessories of the HEV. In some examples, the eCAT is electrically connected to a power source via a plurality of PWM switches.

In the example shown in FIG. 7, the power control system 700 comprises a controller 760, e.g., an engine control module (ECM), in operational communication with each of the BISG 712, the engine 610, one or more the DC-DC converters 730, 735, the eCAT 620, a plurality of heating elements 632, the low voltage battery and bus 740, the high voltage battery and bus 750 (e.g., an HEV power system), and a pump 770. The pump 770 may be a compressor used to pump fluids such as water through the high voltage battery and bus 750, the one or more DC-DC converters 730, 735, and the BISG 712. In some examples, the power control system 700 further comprises an air pump (not shown) used to transfer the thermal energy from the eCAT to the after-treatment system, during, for example, low flow conditions. In such a case, the air pump would be fluidly connected to the engine exhaust system to draw air from the atmosphere through the eCAT 620 to transfer thermal energy from the heating elements 632 in the eCAT 620 to the catalyst.

The present disclosure is not limited to the set-up shown in FIG. 7. For example, the controller 760 may be a stand-alone controller or any other appropriate controller of the hybrid vehicle. For example, the controller may, at least in part, be integrated with another controller of the vehicle. Furthermore, the controller 760 may be configured to operationally communicate with any one or more of the vehicle components shown in FIG. 7, and/or any other appropriate components of the vehicle. For example, controller 760 may be a stand-alone controller configured to operationally communicate with at least one high voltage accessory, an electric motor-generator, and an eCAT, to control the electrical power output of the high voltage battery 750.

While the example shown in FIG. 7 exemplifies the use of the control system 700 for an mHEV, it is understood that the control system 700 may be implemented on an appropriate type of hybrid vehicle, such as a plug-in hybrid electric vehicle (PHEV), having one or more high voltage circuit components and an eCAT 620. System 700 shown in FIG. 7 is configured to supply the electrical power output of a high voltage battery 750 of a hybrid vehicle to the eCAT 620 and provide a regeneration sequence in response to an operational parameter of the eCAT 620 reaching a threshold, as described in the examples above and below.

In some examples, the configuration may not include a hybrid battery at all. For example, when the eCAT load is not dependent on the battery when the eCAT control is regulated by the DCDC, i.e., for a 48V based power supply system that is not a HV system (e.g., PHEV or HEV) the battery may not be required with the DCDC eCAT control.

Figure 8:
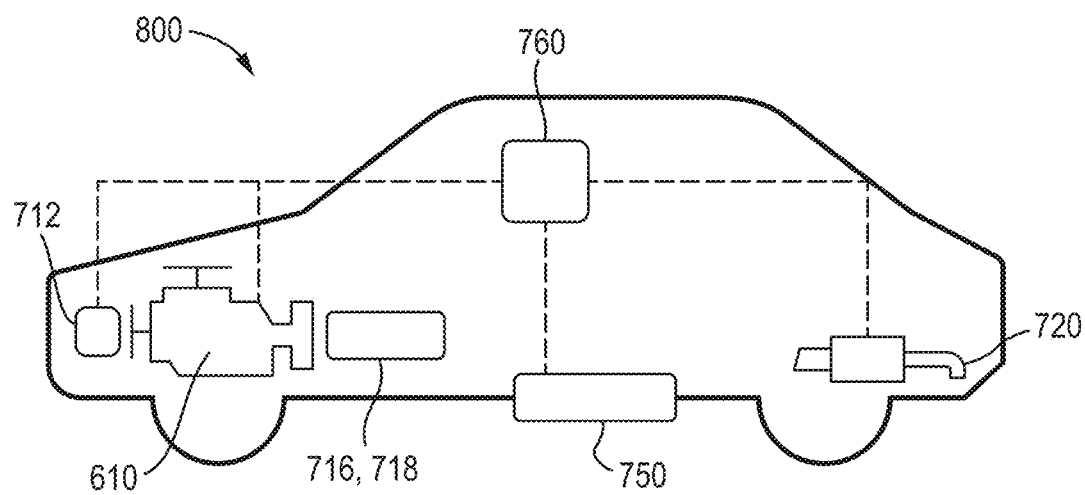
FIG. 8 illustrates a block diagram of a vehicle comprising an exemplary exhaust system, in accordance with at least one of the examples described herein.

FIG. 8 illustrates a vehicle 800 comprising an engine 610, an exemplary exhaust system 720, a control module 760, and a battery 750, in accordance with at least one of the examples described herein. According to some examples, there is provided with vehicle 800 comprises an exhaust after-treatment system 720 as described with reference to FIG. 7. In some examples, the vehicle 800 further comprises a drive train comprising a BISG 712, an engine 610, clutch 716 and transmission 718. The exhaust system 720 may comprise an eCAT as described in any of the examples above.

The methods described above may be implemented on vehicle 800. In some examples, the regeneration sequence of the after-treatment system is based on at least one of: a resistance; a temperature; a power draw; or a current draw, known as operational parameters. In response to a first operational parameter being outside a first threshold range and a second operational parameter being within a second threshold range, in some examples, a Powertrain Control Module (PCM) 760 commands that the system initiates a regeneration sequence of the after-treatment system configured to regenerate at least the first component of the after-treatment system.

Each of the systems in the vehicle are communicatively coupled via controller 760 (illustrated by the dashed line connectors). However, the present disclosure is not limited to the set-up shown in FIG. 8. For example, the controller 760 may be any appropriate type of controller, such as a stand-alone controller, or any other appropriate controller of the hybrid vehicle. For example, the controller 760 may, at least in part, be integrated with another controller of the vehicle. Furthermore, the controller 760 may be configured to operationally communicate with any one or more of the vehicle components shown in FIGS. 6-8, and/or any other appropriate components of the vehicle. For example, controller 760 may be a stand-alone controller at least partially configured to operationally communicate with at least one low voltage accessory, an electric generator, and an eCAT, to control torque demand on the engine 610. Furthermore, it is understood that controller 760 may be configured to carry out one or more of the above-disclosed electrical power control methods for a hybrid vehicle, as described above.

As shown and described with reference to FIGS. 1-6 above, the proposed solution and regeneration strategy will result in a reduction of the eCAT device resistance. A reduced resistance would result in increased power output, which could in turn age or degrade the performance of the eCAT device over time. Therefore, this strategy can prevent exposing the eCAT device to extreme high-power output 'events' over its life, which could risk the device durability and therefore emissions robustness over 15 years. The eCAT is a dynamically controlled load, with low inductance and therefore it has a quick response. The DCDC control of the eCAT results in numerous advantages and is part of the system for various reasons, but in this instance can be utilized to modulate the input voltage to the eCAT device as the resistance increases to maintain the eCAT output power. In addition, there is no additional impact to cost or package in deploying this strategy because this strategy utilizes the existing components of the system (i.e., an additional DCDC is not needed to be added to the vehicle platform to enable the disclosure eCAT and particulate filter regeneration sequences). Another key advantage is that the solution benefits from components that are already part of the system to yield improvements in emissions robustness and durability robustness over the life of the vehicle, which will be crucial at EU7.

Figure 9:
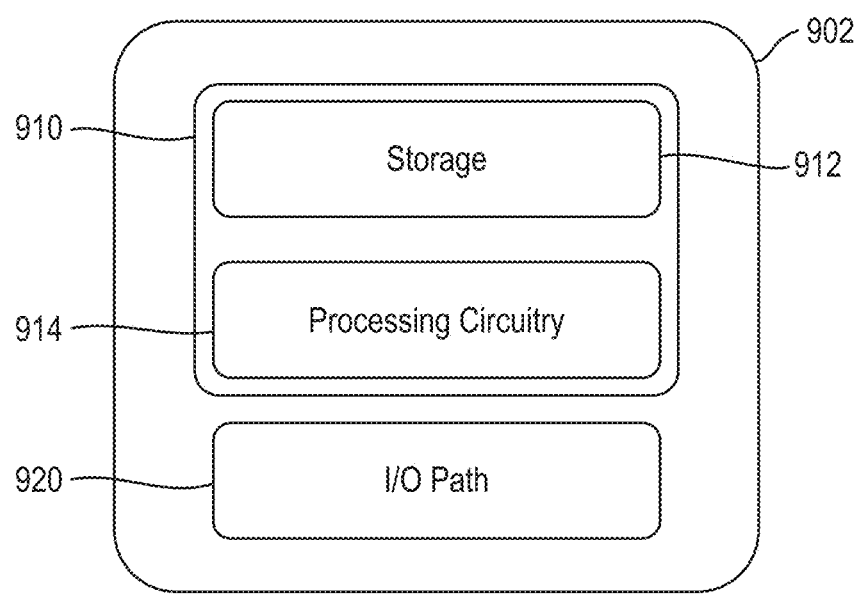
FIG. 9 illustrates a block diagram of a computing module, in accordance with some examples of the disclosure.

FIG. 9 illustrates a block diagram 900 of computing module 902, in accordance with some examples of the disclosure. In some examples, computing module 902 may be communicatively connected to a user interface. In some examples, computing module 902, may be the controller 760 of the vehicle 800 as described with FIG. 8. In some examples, computing module 902 may include processing circuitry, control circuitry, and storage (e.g., RAM, ROM, hard disk, a removable disk, etc.). Computing module 902 may include an input/output path 1206. I/O path 920 may provide device information, or other data, over a local area network (LAN) or wide area network (WAN), and/or other content and data to control circuitry 910, which includes processing circuitry 914 and storage 912. Control circuitry 910 may be used to send and receive commands, requests, signals (digital and analog), and other suitable data using I/O path 920. I/O path 920 may connect control circuitry 910 (and specifically processing circuitry 914) to one or more communications paths. In some examples, computing module 902 may be an on-board computer of a vehicle, such as vehicle 700.

Control circuitry 910 may be based on any suitable processing circuitry such as processing circuitry 914. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some examples, processing circuitry may be distributed across multiple separate processors or processing units, for example, multiple of the same type of processing units (e.g. two Intel Core i7 processors) or multiple different processors (e.g., an Intel Core i5 processor and an Intel Core i7 processor). In some examples, control circuitry 914 executes instructions for computing module 902 stored in memory (e.g., storage 912).

The memory may be an electronic storage device provided as storage 912, which is part of control circuitry 910. As referred to herein, the phrase "electronic storage device" or "storage device" should be understood to mean any device for storing electronic data, computer software, or firmware, such as random-access memory, read-only memory, hard drives, solid-state devices, quantum storage devices, or any other suitable fixed or removable storage devices, and/or any combination of the same. Non-volatile memory may also be used (e.g., to launch a boot-up routine and other instructions). Storage 912 may be sub-divided into different spaces such as kernel space and user space. Kernel space is a portion of memory or storage that is, e.g., reserved for running a privileged operating system kernel, kernel extensions, and most device drivers. User space may be considered an area of memory or storage where application software generally executes and is kept separate from kernel space so as to not interfere with system-vital processes. Kernel mode may be considered as a mode when control circuitry 910 has permission to operate on data in kernel space, while applications running in user mode must request control circuitry 910 to perform tasks in kernel mode on its behalf Computing module 902 may be coupled to a communications network. The communication network may be one or more networks including the Internet, a mobile phone network, mobile voice or data network (e.g., a 3G, 4G, 5G or LTE network), mesh network, peer-to-peer network, cable network, cable reception (e.g., coaxial), microwave link, DSL reception, cable internet reception, fiber reception, over-the-air infrastructure or other types of communications network or combinations of communications networks. Computing module 902 may be coupled to a secondary communication network (e.g., Bluetooth, Near Field Communication, service provider proprietary networks, or wired connection) to the selected device for generation for playback. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths.

In some examples, the control circuitry 910 is configured to carry out any of the methods as described herein. For example, storage 912 may be a non-transitory computer-readable medium having instructions encoded thereon, to be carried out by processing circuitry 914, which cause control circuitry 910 to carry out a method for regenerating an after-treatment system of a vehicle. For example, the control circuitry may carry out a method comprises the steps of: monitoring a first operational parameter of a first component of the after-treatment system; monitoring a second operational parameter, different to the first operational parameter, of a second component of the after-treatment system; determining if the first operational parameter of the first component is outside a first threshold range; determining if the second operational parameter is approaching a second threshold; and in response to the first operational parameter being outside the first threshold range and the second operational parameter being within the second threshold range, initiating a regeneration sequence of the after-treatment system configured to regenerate at least the first component of the after-treatment system.

It should be understood that the examples described above are not mutually exclusive with any of the other examples described with reference to FIGS. 1-9. The order of the description of any examples is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Other variations to the disclosed examples can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

This disclosure is made to illustrate the general principles of the systems and processes discussed above and is intended to be illustrative rather than limiting. More generally, the above disclosure is meant to be exemplary and not limiting and the scope of the disclosure is best determined by reference to the appended claims. In other words, only the claims that follow are meant to set bounds as to what the present disclosure includes.

While the present disclosure is described with reference to particular example applications, it shall be appreciated that the disclosure is not limited thereto. It will be apparent to those skilled in the art that various modifications and improvements may be made without departing from the scope and spirit of the present disclosure. Those skilled in the art would appreciate that the actions of the processes discussed herein may be omitted, modified, combined, and/or rearranged, and any additional actions may be performed without departing from the scope of the disclosure.

Any system feature as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some, and/or all features in one aspect can be applied to any, some, and/or all features in any other aspect, in any appropriate combination. It should also be appreciated that particular combinations of the various features described and defined in any aspect can be implemented and/or supplied and/or used independently.

The invention claimed is:

1. A method for regenerating an after-treatment system of a vehicle, the method comprising:
monitoring a first operational parameter of a first component of the after-treatment system;
monitoring a second operational parameter, different to the first operational parameter, of a second component of the after-treatment system;
determining if the first operational parameter of the first component is outside a first threshold range;
determining if the second operational parameter is approaching a second threshold range;
in response to the first operational parameter being outside the first threshold range and the second operational parameter being within the second threshold range, initiating a regeneration sequence of the after-treatment system configured to regenerate at least the first component of the after-treatment system;
determining if the first operational parameter of the first component is outside of a third threshold range, larger than the first threshold range; and
in response to the first operational parameter not being outside of the third threshold range, initiating a regeneration sequence configured to regenerate the first component and a second component.

2. The method of claim 1, wherein determining if the second operational parameter is within the second threshold range is carried out in response to the first operational parameter being outside the first threshold range.

3. The method of claim 1, further comprising:
initiating a first regeneration sequence comprising a first regeneration cycle of the first component of the after-treatment system; and
wherein the second component is not regenerated as a part of the first regeneration sequence.

4. The method of claim 1, further comprising:
determining if a current vehicle usage allows for a regeneration sequence of the after-treatment system configured to regenerate the first component and second component of the after-treatment system; and
in response to the vehicle usage not allowing regeneration of the first and second component, initiating a second regeneration sequence comprising the first regeneration cycle of the first component for a first time period; and
after expiry of the first time period, initiating a first regeneration cycle of the second component.

5. The method of claim 1, further comprising:
in response to the first operational parameter being outside of the third threshold range, initiating another regeneration sequence configured to regenerate the first component and the second component.

6. The method of claim 1, further comprising:
wherein the first component is an electrically heated catalyst; and
wherein the second component is a particular filter.

7. The method of claim 1, wherein the operational parameter is at least one of: a resistance; a temperature; a power draw; emissions output; or a current draw.

8. The method of claim 1, wherein the threshold of the operational parameter is configurable.

9. The method of claim 1, wherein the regeneration sequence is carried out during low-flow conditions in the after-treatment system.

10. An after-treatment system of a vehicle comprising:
an electrically heated catalyst, electrically coupled to a power source;
a particulate filer; and
a controller, communicatively coupled to the electrically heated catalyst, the particulate filter, and the power source, the controller configured to:
monitor a first operational parameter of the electrically heated catalyst;
monitor a second operational parameter, different to the first operational parameter, of the particulate filter;
determine if the first operational parameter is outside a first threshold range;
determine if the second operational parameter is approaching a second threshold range;
in response to the first operational parameter being outside the first threshold range and the second operational parameter being within the second threshold range, initiate a regeneration sequence of the after-treatment system configured to regenerate at least the electrically heated catalyst;
determine if the first operational parameter of the electrically heated catalyst is outside of a third threshold range, larger than the first threshold range; and
in response to the first operational parameter not being outside of the third threshold range, initiating a regeneration sequence configured to regenerate the electrically heated catalyst and the particulate filter.

11. The after-treatment system of claim 10, wherein determining if the second operational parameter is within the second threshold range is carried out in response to the first operational parameter being outside the first threshold range.

12. The after-treatment system of claim 10, the controller further configured to:
initiate a first regeneration sequence comprising a first regeneration cycle of the electrically heated catalyst; and
wherein the particulate filter is not regenerated as a part of the first regeneration sequence.

13. The after-treatment system of claim 10, the controller further configured to:
determine if a current vehicle usage allows for a regeneration sequence of the after-treatment system configured to regenerate the first component and second component of the after-treatment system; and in response to the vehicle usage not allowing regeneration of the first and second component, initiating a second regeneration sequence comprising the first regeneration cycle of the first component for a first time period; and after expiry of the first time period, initiating a first regeneration cycle of the particulate filter.

14. The after-treatment system of claim 10, the controller further configured to:

in response to the first operational parameter being outside of the third threshold range, initiating another regeneration sequence configured to regenerate the electrically heated catalyst and the particulate filter.

15. The after-treatment system of claim 10, wherein the operational parameter is at least one of: a resistance; a temperature; a power draw; emissions output; or a current draw.

16. The after-treatment system of claim 10, wherein:

the threshold of the operational parameter is configurable;

the regeneration sequence comprises increasing a power delivered to the electrically heated catalyst; and the regeneration sequence is carried out during low-flow conditions in the after-treatment system.

17. A vehicle comprising the after-treatment system of claim 10.

18. A non-transitory computer-readable medium having instructions encoded thereon for carrying out method for regenerating an after-treatment system of a vehicle, the method comprising:

monitoring a first operational parameter of a first component of the after-treatment system;

monitoring a second operational parameter, different to the first operational parameter, of a second component of the after-treatment system;

determining if the first operational parameter of the first component is outside a first threshold range;

determining if the second operational parameter is approaching a second threshold range;

in response to the first operational parameter being outside the first threshold range and the second operational parameter being within the second threshold range, initiating a regeneration sequence of the after-treatment system configured to regenerate at least the first component of the after-treatment system;

determining if the first operational parameter of the first component is outside of a third threshold range, larger than the first threshold range; and in response to the first operational parameter not being outside of the third threshold range, initiating a regeneration sequence configured to regenerate the first component and a second component.

* * * * *